(12) United States Patent
Miller

(10) Patent No.: US 9,376,261 B1
(45) Date of Patent: Jun. 28, 2016

(54) EXPANDABLE MATERIAL MOVER WITH AUGERS

(71) Applicant: Patrick A. Miller, Luckey, OH (US)

(72) Inventor: Patrick A. Miller, Luckey, OH (US)

( * ) Notice: Subject to any disclaimer, the term of this patent is extended or adjusted under 35 U.S.C. 154(b) by 0 days.

(21) Appl. No.: 14/574,712

(22) Filed: Dec. 18, 2014

(51) Int. Cl.
*B65G 33/18* (2006.01)
*A01D 34/53* (2006.01)
*B65G 33/26* (2006.01)
*B65G 33/08* (2006.01)
*B65G 37/00* (2006.01)

(52) U.S. Cl.
CPC ............... *B65G 33/26* (2013.01); *B65G 33/08* (2013.01); *B65G 37/00* (2013.01)

(58) Field of Classification Search
CPC .... B65G 33/18; B65G 69/0433; A01D 34/28; A01D 34/53
USPC ............ 198/660, 662, 663, 672, 676; 56/220, 56/221, 222, 225
See application file for complete search history.

(56) References Cited

U.S. PATENT DOCUMENTS

| | | | |
|---|---|---|---|
| 3,478,448 A | 11/1969 | Bacon | |
| 3,561,198 A * | 2/1971 | Herbsthofer | A01D 41/148 56/11.9 |
| 3,913,247 A | 10/1975 | Ruhl | |
| 4,038,810 A * | 8/1977 | Williams | A01D 75/02 56/220 |
| 4,356,910 A * | 11/1982 | Togstad | B65G 33/32 198/660 |
| 4,487,004 A * | 12/1984 | Kejr | A01D 41/14 56/14.4 |
| 4,910,946 A | 3/1990 | Underwood | |
| 5,671,595 A * | 9/1997 | Burmann | A01D 41/14 56/119 |
| 5,871,081 A * | 2/1999 | Gaalswyk | G01F 13/005 198/502.4 |
| 6,089,795 A * | 7/2000 | Booth | B60P 1/42 209/133 |
| 6,247,254 B1 | 6/2001 | Wessman | |
| 6,327,798 B1 | 12/2001 | Sakai et al. | |
| D457,171 S | 5/2002 | Fowler | |
| 6,499,237 B2 | 12/2002 | Johnson | |
| 6,860,041 B2 | 3/2005 | Sakai et al. | |
| 7,404,283 B2 * | 7/2008 | Viaud | A01D 41/148 56/15.5 |
| 8,635,842 B2 * | 1/2014 | Markt | A01D 41/14 56/14.7 |
| 8,746,439 B2 * | 6/2014 | Houssian | A01C 15/003 198/660 |
| 8,833,481 B2 * | 9/2014 | Blunier | A01B 73/044 172/311 |
| 9,068,298 B2 * | 6/2015 | Everett | B65G 69/0433 |
| 2011/0315465 A1 | 12/2011 | Henry | |

* cited by examiner

*Primary Examiner* — Douglas Hess
(74) *Attorney, Agent, or Firm* — Taylor IP, P.C.

(57) ABSTRACT

A material moving apparatus includes a housing assembly with a central section and at least one wing section positioned on a lateral end of the central section that is movable toward and away from the central section; and an auger arrangement carried by the housing assembly having at least one auger that includes a plurality of auger shafts which are telescopically movable relative to each other and a plurality of flight sections that each have a first end and a second end. Each flight sections is rotated by a corresponding auger shaft and at least one of the flight sections is configured to slide its first end past a second end of another flight section without rotating as its corresponding auger shaft telescopically moves.

19 Claims, 6 Drawing Sheets

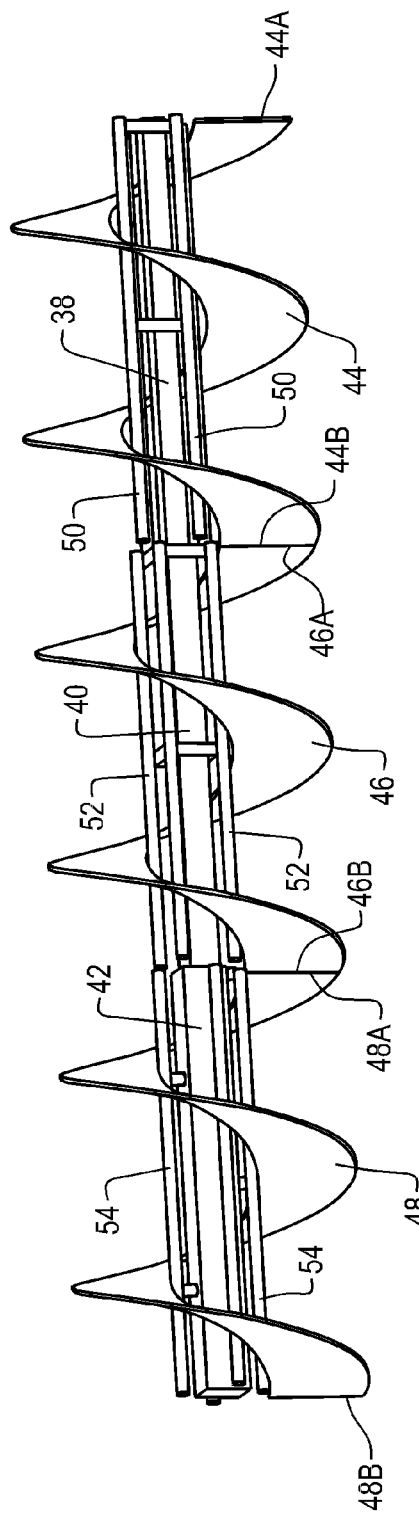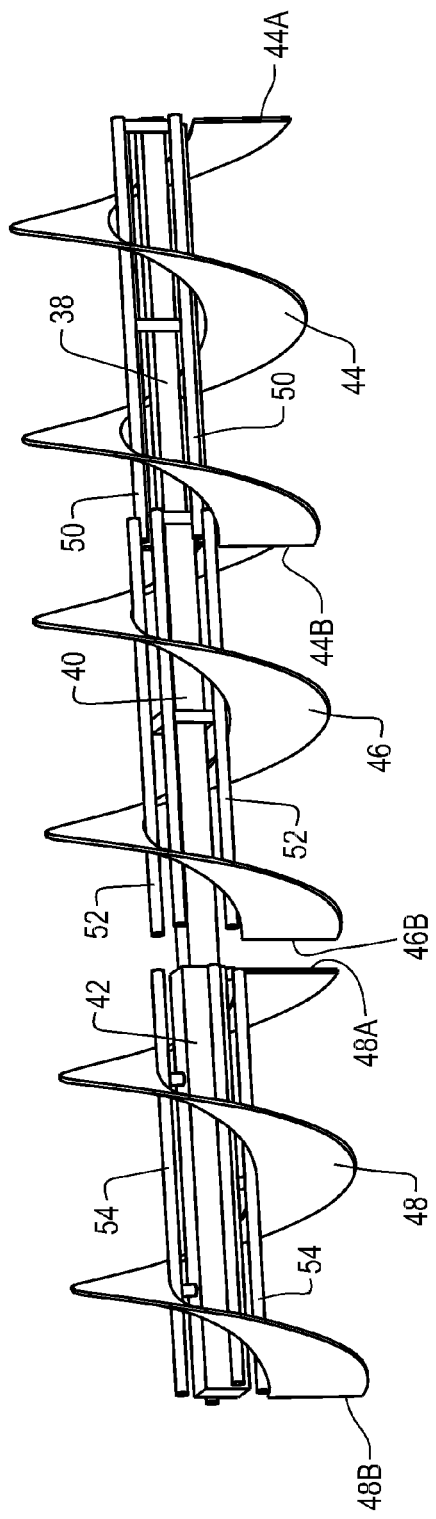

EXPANDABLE MATERIAL MOVER WITH AUGERS

BACKGROUND OF THE INVENTION

1. Field of the Invention

The present invention relates to material movers, and, more particularly, to material movers equipped with augers.

2. Description of the Related Art

Material movers, such as snow blowers, are known that direct material from ends of the material mover toward a blower or other similar element, typically located near the center of the material mover, that can direct the material to a desired location. The material movers can have a fixed width, i.e., distance between the ends of the material mover from which material is moved, or have an adjustable width. An advantage of an adjustable width material mover is being able to increase the width of the material mover to increase the amount of material that can be moved but also being able to decrease the width of the material mover when a larger width is either unnecessary or would interfere with desirable operation.

When the material mover incorporates an auger system to direct material toward the center from the ends, it is difficult to extend and retract the auger flight due to its helical shape and rigidity that is needed to effectively direct material toward the center of the material mover. Known devices with extendable augers are described in U.S. Pat. No. 4,910,946 ("Underwood") and U.S. Pat. No. 4,356,910 ("Togstad"). One shortcoming of these extendable augers is that their construction is relatively complex, which provides multiple possible failure points during operation. Togstad, for example, discloses an extendable auger with two auger tubes that are telescopic relative to each other and each have a flight. The flight of one auger tube is hollow and the flight of the other auger tube is solid, with the configurations of the flights being such that the solid flight will thread into the hollow flight as the solid flight rotates relative to the hollow flight, allowing extension and retraction of the auger. This construction requires a mechanism that allows the hollow flight and solid flight to rotate independently of one another so that the solid flight can be threaded into the hollow flight, which adds complexity to the system.

What is needed in the art is an expandable material mover that is less complex than known devices.

SUMMARY OF THE INVENTION

The present invention provides a material moving apparatus that includes an auger with telescopic auger shafts and flight sections attached to the telescopic auger shafts that can slide past one another without rotating.

The invention in one form is directed to a material moving apparatus including a housing assembly with a central section and at least one wing section positioned on a lateral end of the central section that is movable toward and away from the central section; and an auger arrangement carried by the housing assembly having at least one auger that includes a plurality of auger shafts which are telescopically movable relative to each other and a plurality of flight sections that each have a first end and a second end. Each flight sections is rotated by a corresponding auger shaft and at least one of the flight sections is configured to slide its first end past a second end of another flight section without rotating as its corresponding auger shaft telescopically moves.

The invention in another form is directed to a material moving apparatus including a housing assembly with a central section and a pair of wing sections that are each positioned on an opposing side of the central section and at least one of the wing sections is movable toward and away from the central section; and an auger arrangement carried by the housing assembly that includes two augers configured to counter rotate relative to one another, the two augers each include a plurality of auger shafts which are telescopically movable relative to each other and a plurality of flight sections that each have a first end and a second end. Each flight section is rotated by a corresponding auger shaft and at least one of the flight sections is configured to slide its first end past a second end of another flight section without rotating as its corresponding auger shaft telescopically moves.

The invention in yet another form is directed to an auger arrangement including a plurality of auger shafts which are telescopically movable relative to each other and a plurality of flight sections that each have a first end and a second end. Each flight section is rotated by a corresponding auger shaft and at least one of the flight sections is configured to slide its first end past a second end of another flight section without rotating as its corresponding auger shaft telescopically moves.

An advantage of the present invention is that the material moving apparatus can be extended using a less complicated construction than what is known.

Another advantage is that the augers can be rotated by the same element without the need for a special mechanism to independently rotate the augers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a perspective view of the auger arrangement shown in FIGS. 2-3 in a fully expanded state;

FIG. 5 is a perspective view of the auger arrangement shown in FIG. 4 retracting;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
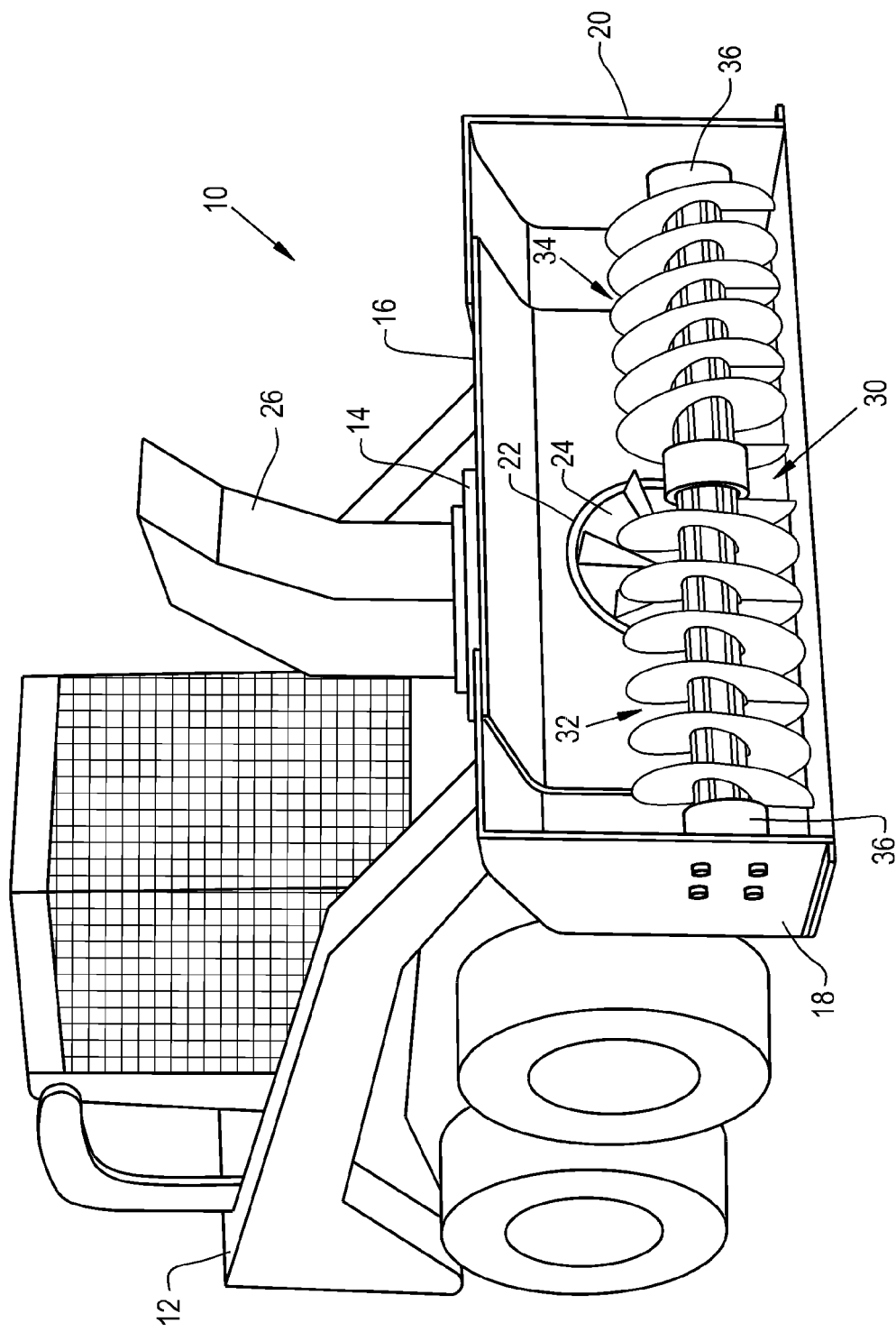
FIG. 1 is a perspective view of an embodiment of a material moving assembly according to the present invention.

Referring now to the drawings, and more particularly to FIG. 1, there is shown an embodiment of a material moving apparatus 10 according to the present invention attached to a skid loader 12. The material moving apparatus 10 is attached to the skid loader 12 so that the material moving apparatus 10 can be moved by the skid loader 12 and powered by the skid loader 12 via a power take off or similar mechanism that is driven by the engine (not shown) of the skid loader 12. It should be appreciated that the material moving apparatus 10 according to the present invention can also be adapted to be moved by a human operator, have an independent power source, such as a gasoline or electric engine, for operation, or be attached to vehicles other than a skid loader. It should be further appreciated that the material moving apparatus 10 according to the present invention could also be held stationary with material being fed to the material moving apparatus 10 by a conveyor or other similar mechanism.

As can be seen, the material moving apparatus 10 includes a housing assembly 14 with a central section 16 and a pair of wing sections 18, 20 attached to lateral ends of the central section 16. The central section 16 of the housing assembly 14 is attached to the skid loader 12 and can include an egress opening 22 for material to be forced out of by a material mover 24, shown here as an impeller. The material mover 24 can be any sort of construction that allows for material supplied to the material mover 24 to be removed from the path of the housing assembly 14 through the egress opening 22, such as the shown impeller or a blower. The material that is forced through the egress opening 22 can be directed by a chute 26 toward a desired location, such as a portion of a roadway where vehicles do not normally travel or a designated material accumulation point. One or both of the wing sections 18, 20 can be movable, relative to the central section 16, to adjust the effective width of the housing assembly 14. Such a configuration allows for the housing assembly 14 to be capable of moving more material when the wing sections 18, 20 expand the width of the housing assembly 14 while also being able to retract back to a smaller width when desired. The housing assembly 14 can be configured in any desired fashion to allow one or more of the wing sections 18, 20 to be able to move toward and away from the central section 16. An example of such a configuration is described in U.S. Pat. No. 8,887,413 to Miller, which is incorporated herein by reference.

The material moving apparatus 10 includes an auger arrangement 30 that is carried by the housing assembly 14. As shown, the auger arrangement 30 can direct and supply material to the material mover 24 so that the material can be forced through the egress opening 22. The auger arrangement 30 includes one or more augers 32, 34 that can have portions held within pillow block bearings 36 attached to the wing sections 18, 20. As will be described further below, the augers 32, 34 have a configuration that allows for expansion and retraction of one or both of the augers 32, 34 so that the effective width of the augers 32, 34 can be increased to direct material from their respective wing sections 18, 20 toward the material mover 24. The augers 32 and 34 are configured to counter rotate relative to each other, i.e., auger 32 directs material in a direction that is opposite to the direction auger 34 directs material. If augers 32 and 34 both rotate about an axis of rotation in the same direction, auger 32 can have left-handed helical flighting and auger 34 can have right-handed helical flighting, as shown. Alternatively, augers 32 and 34 can rotate in opposite directions about an axis of rotation to counter rotate relative to each other. The material mover 24 can be configured as an impeller that is rotated by the same element that rotates augers 32 and 34 to direct material supplied to the impeller 24 by the augers 32 and 34 into and out of the egress opening 22. In such a configuration, impeller 24 can be driven such that it rotates at a higher rotational speed than the augers 32 and 34 to account for the impeller 24 being supplied with and needing to move material from both augers 32 and 34.

Figure 2:
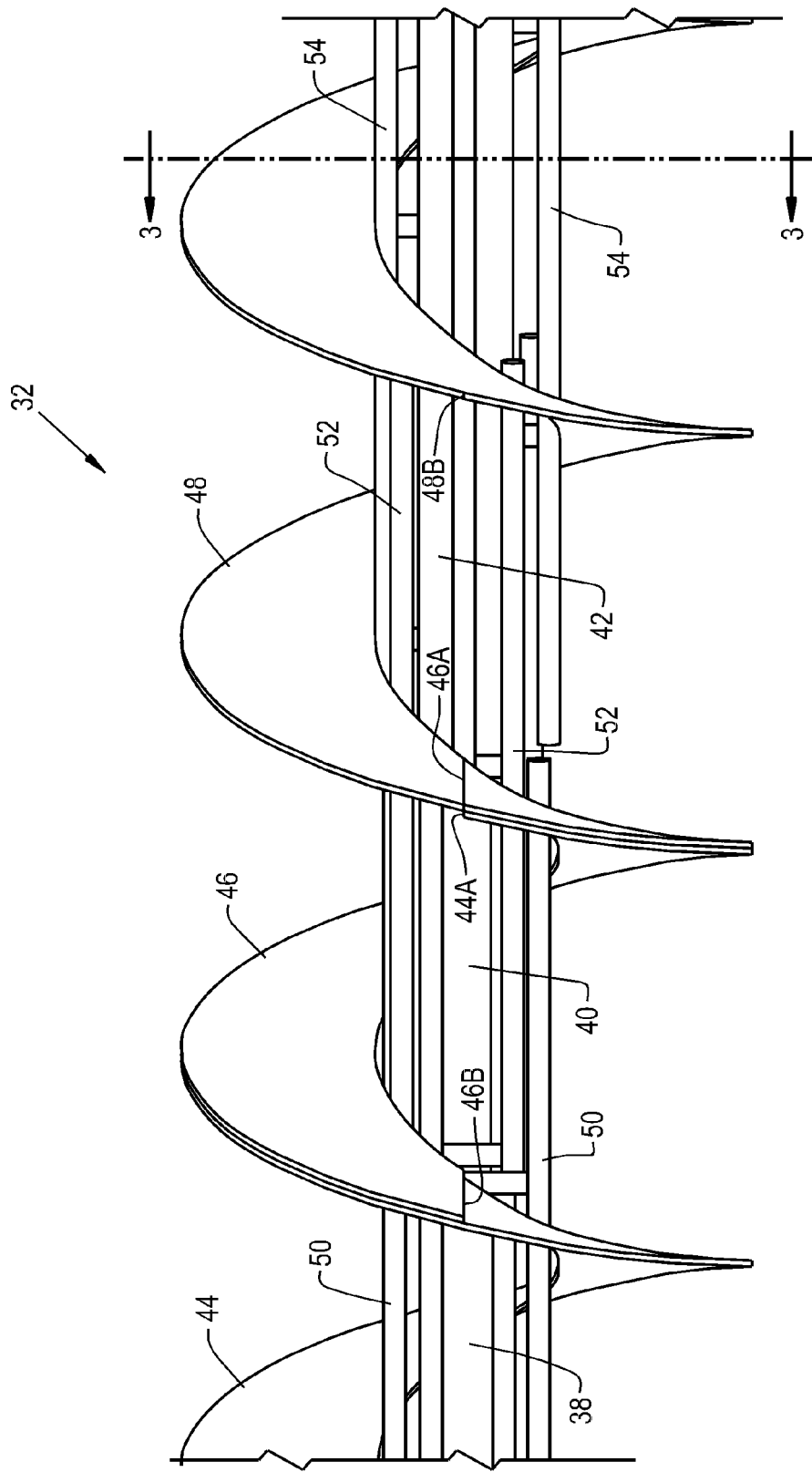
FIG. 2 is a side view of an embodiment of an auger arrangement according to the present invention.

Referring now to FIGS. 2-9, auger 32 is shown in greater detail. It should be appreciated that auger 34 can be configured similarly or identically to auger 32 and that FIGS. 2-9 focus on auger 32 for ease of illustration and to show more detail than possible by focusing on both augers 32, 34. As shown in FIG. 2, auger 32 is in a fully retracted state and includes auger shafts 38, 40 and 42. While three auger shafts 38, 40 and 42 are shown, auger 32 could include as few as two auger shafts or more than three auger shafts, if desired. The auger shafts 38, 40 and 42 are sized and arranged so that the auger shafts 38, 40 and 42 can telescope relative to each other, i.e., the auger shafts 40 and 42 can be moved away from and toward auger shaft 38 while being coaxial with and at least partially surrounding auger shaft 38. Each auger shaft 38, 40 and 42 has a respective flight section 44, 46 and 48 with a helical shape that is rotated by the auger shaft 38, 40 and 42. Each flight section 44, 46 and 48 has a respective first end 44A, 46A, and 48A and second end 44B, 46B and 48B. While reference is made to "first" and "second" ends of the flight sections 44, 46 and 48, these references are only used for ease of description and not intended to denote any specific end of each flight section 44, 46 and 48 necessarily being a first end or a second end. The flight sections 44, 46 and 48 can be formed as either left-handed or right-handed flight sections with any desired dimensions such as length, pitch, helix angle, etc. The flight sections 44, 46 and 48 can be attached to their respective auger shaft 38, 40 and 42 by auger rods 50, 52 and 54 that are welded or otherwise connected to the flight sections 44, 46 and 48. The auger rods 50, 52 and 54 can have a circular cross-section and be connected to their respective flight sections 44, 46 and 48 at one or more inner diameters of the flight sections 44, 46 and 48 so that the flight sections 44, 46 and 48 can have a constant helical shape that does not have irregular areas to allow for connection to a respective auger shaft. As can be seen, the auger rods 50, 52 and 54 are offset relative to each other so that as the auger shafts 38, 40 and 42 telescope relative to each other, the auger rods 50, 52 and 54 do not slide into each other and interfere with the telescopic movement of the auger shafts 38, 40 and 42.

Figure 3:
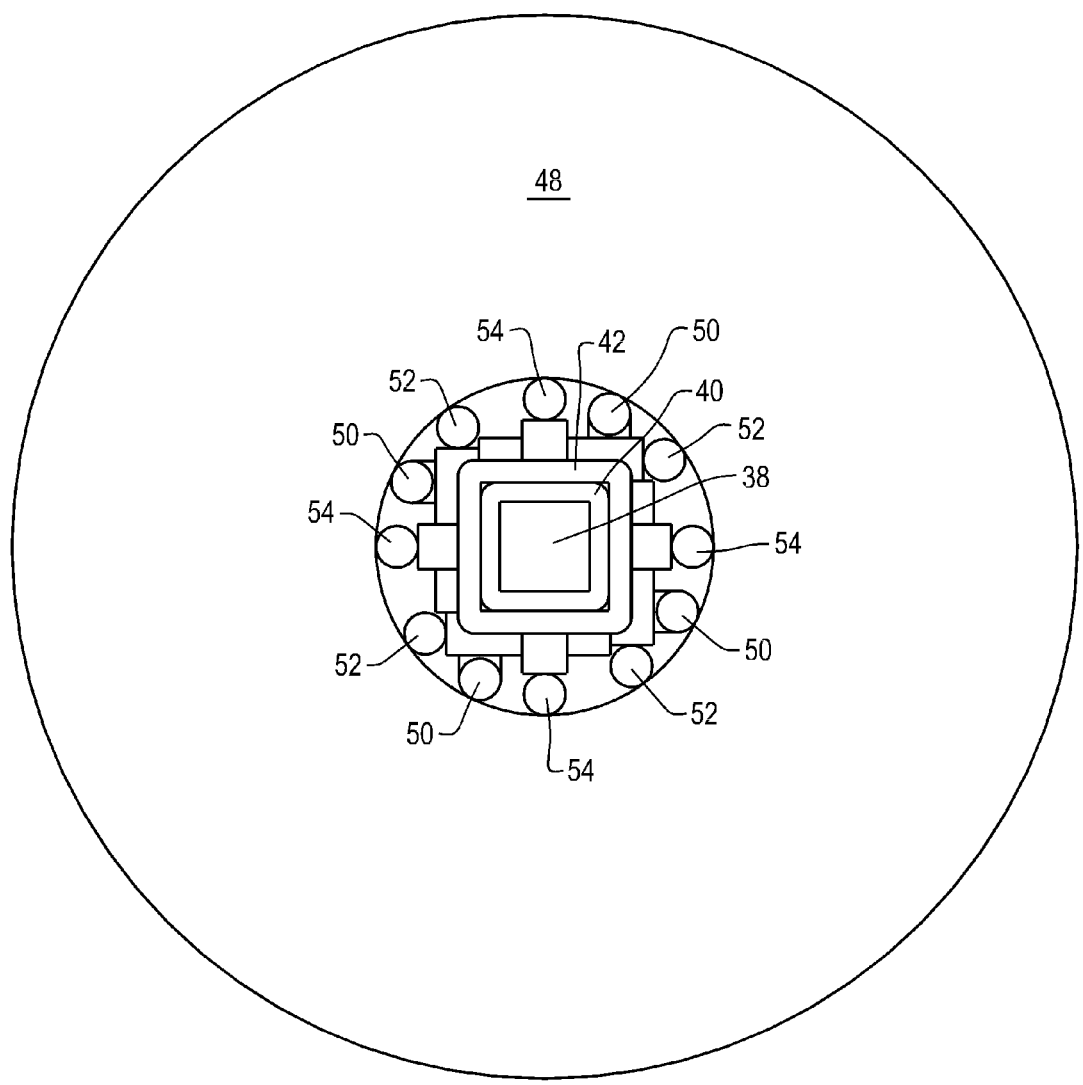
FIG. 3 is a cross-sectional view of the auger arrangement shown in FIG. 2 taken along line 3-3.

Referring now to FIG. 3, a cross-section of the auger 32 is shown to illustrate how the auger shafts 38, 40 and 42 are shaped and oriented relative to each other. As can be seen, the auger shafts 38, 40 and 42 can each have a substantially squared shape that is contacting at least one other auger shaft so that there is not significant relative rotation between the auger shafts 38, 40 and 42 and rotation of any individual auger shaft 38, 40 or 42 will cause rotation of all the auger shafts 38, 40 and 42. As used herein, "significant relative rotation" between the auger shafts 38, 40 and 42 is defined as being enough relative rotation between two or more of the auger shafts 38, 40 and 42 to orient one or more of the flight sections 44, 46 and 48 in such a way that its first end is unable to slide past a second end of another flight section as its corresponding auger shaft telescopically moves without a corrective relative rotation between the two corresponding auger shafts, which will be described further herein. The auger shafts 38, 40 and 42 can also have other cross-sectional shapes, such as triangular, that does not allow for significant relative rotation between the auger shafts 38, 40 and 42 but allows rotation of one auger shaft to cause rotation of all the auger shafts. The auger shafts 38, 40 and 42 could also be rotated independently, if desired. In a configuration where rotation of one auger shaft causes rotation of the other auger shafts, auger shaft 38, for example, can be attached in a linearly stationary manner to the central section 16, where it is rotated to provide rotation to the other auger shafts 40 and 42 and flight sections 44, 46 and 48. Auger shaft 42, which will telescope the furthest away from auger shaft 38, can have the largest cross-sectional area, as shown, and auger shaft 40 can have a smaller cross-sectional area than auger shaft 42 but a larger cross-sectional area than stationary auger shaft 38. This configuration allows for sequential telescoping of the auger shafts 38, 40 and 42, which is illustrated in FIGS. 4-9.

Referring now to FIG. 4, the auger 32 is shown in a fully expanded state with the auger shafts 38, 40 and 42 maximally telescoped relative to each other. As can be seen, the second end 44B of flight section 44 is aligned with the first end 46A of flight section 46 and the second end 46B of flight section 46 is aligned with the first end 48A of flight section 48B, forming a substantially continuous flight across the width of auger 32. As used herein, "substantially continuous" refers to the helical shape of the formed flight being completely or mostly continuous to allow material to be directed along the length of the formed flight as the auger shafts 38, 40 and 42 rotate, but there can be a gap formed between aligned flight section ends of between 0 to about 10 centimeters, i.e., the first and second ends do not need to abut against one another or contact. Such a gap can account for slippage that might occur between the auger shafts 38, 40 and 42 as they rotate and could interfere with the ability of the ends of one or more of the flight sections 44, 46 and 48 to slide past one another. While not shown in FIG. 4, a portion of auger shaft 42 can be held in the pillow block bearing 36 attached to wing section 18 and attached to the wing section 18 such that expansion and retraction of the wing section 18 relative to the central section 16 pulls or pushes on the auger shaft 42 to cause telescoping of the auger 32. Alternatively, an actuator (not shown) could cause telescoping of the auger shafts 38, 40 and 42 to expand and retract auger 32, pushing or pulling the wing section 18 as the auger 32 expands or retracts.

Referring now to FIG. 5, the auger 32 is shown in a partially retracted state. As can be seen, the first end 46A of flight section 46 has slid past the second end 44B of flight section 44 due to telescoping of auger shaft 40 over auger shaft 38. Since a substantially continuous flight can be formed when the first end 46A of flight section 46 is aligned with the second end 44B of flight section 44, the first end 46A can slide past the second end 44B as its respective auger shaft 40 telescopes over auger shaft 38 without the need to rotate relative to auger shaft 38. Rather, rotation of the auger shaft 40 relative to auger shaft 38 could cause the orientation of flight sections 44 and 46 to be such that the first end 46A could not slide past the second end 44B, which could lead to jamming of the auger 32. In this sense, having the shape of the auger shafts 38, 40 and 42 be such that relative rotation between the auger shafts 38, 40 and 42 is impeded allows for the auger 32 to consistently expand and retract with a low risk of jamming and without the need for a mechanism to control the rotation of the auger shafts 38, 40 and 42 relative to each other. It should be appreciated that the first end 46A of flight section 46 can also slide past the second end 44B of flight section 44 while the respective auger shafts 38 and 40 rotate together and not relative to each other, or even when the auger shafts 38 and 40 rotate relative to each other so long as the first end 46A and the second end 44B are oriented such that sliding of the first end 46A past the second end 44B is not impeded.

Figure 6:
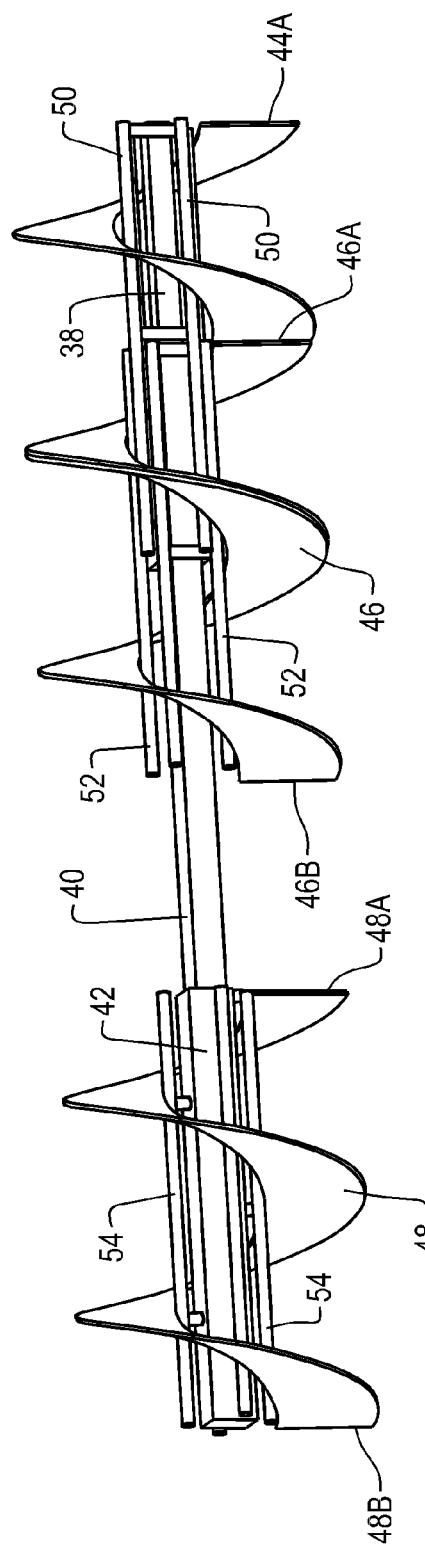
FIG. 6 is a perspective view of the auger arrangement shown in FIG. 5 further retracted.

Referring now to FIG. 6, auger 32 is shown further retracted with auger shaft 40 and associated flight section 46 fully retracted. As can be seen, the flight sections 44, 46 and 48 have an identical shape that allows flight section 46 to stack on flight section 44 when auger shaft 40 returns to its unexpanded state. Such a configuration can allow for there to be little, if any, separation between the flight sections 44, 46 and 48 when the width of auger 32 is minimized and the auger shafts 38, 40 and 42 are fully retracted. Although the flight sections 44, 46 and 48 are shown as being identical flight sections, it should be appreciated that this is an optional configuration and not required according to the present invention. In this state, there is a maximum separation between the first end 48A of flight section 48 and the second end 46B of flight section 46, due to the sequential telescopic movement of the auger shafts 38, 40 and 42, but the auger 32 could also be configured such that the auger shafts 38, 40 and 42 telescopically move in a relatively consistent, rather than sequential, fashion.

Figure 7:
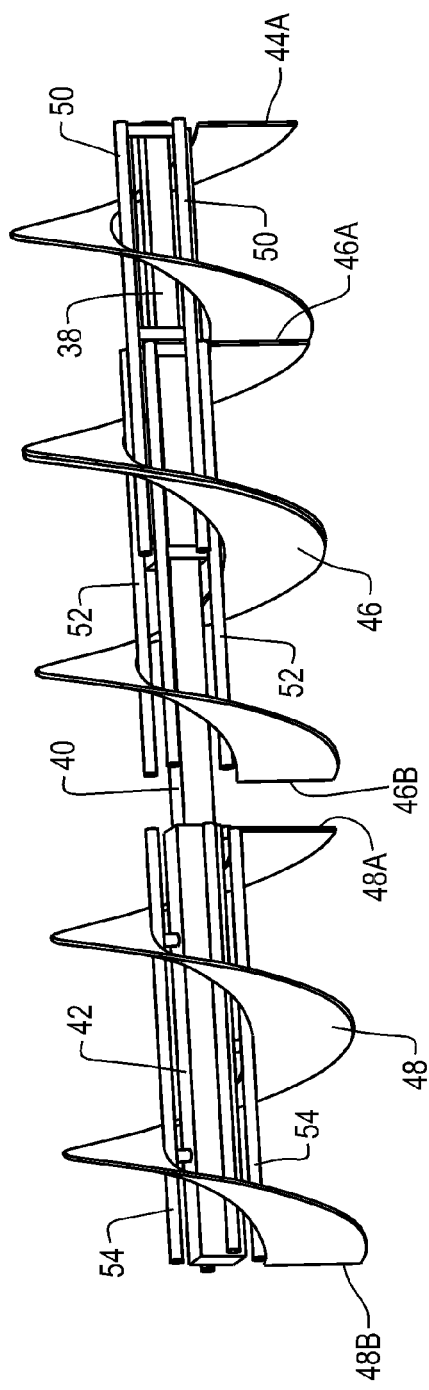
FIG. 7 is a perspective view of the auger arrangement shown in FIG. 6 further retracted.
Figure 8:
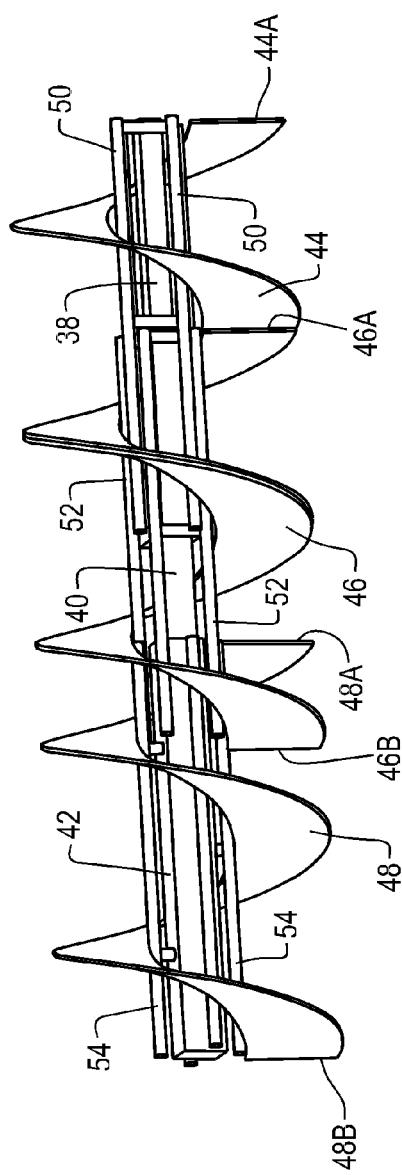
FIG. 8 is a perspective view of the auger arrangement shown in FIG. 7 further retracted.

Referring now to FIGS. 7-8, auger 32 is shown further retracted with auger shaft 42 and associated flight section 48 telescoping over auger shaft 40. As can be seen in FIG. 7, the first end 48A of flight section 48 is oriented relative to the second end 46B of flight section 46 such that further telescopic retraction of auger shaft 42 relative to auger shaft 40 will slide the first end 48A past the second end 46B, as shown in FIG. 8, without rotating auger shaft 42 and associated flight section 48 relative to auger shaft 40 and associated flight section 46. In this sense, telescopic retraction of auger shaft 42 and associated flight section 48 is similar to the telescopic retraction of auger shaft 40 and associated flight section 46.

Figure 9:
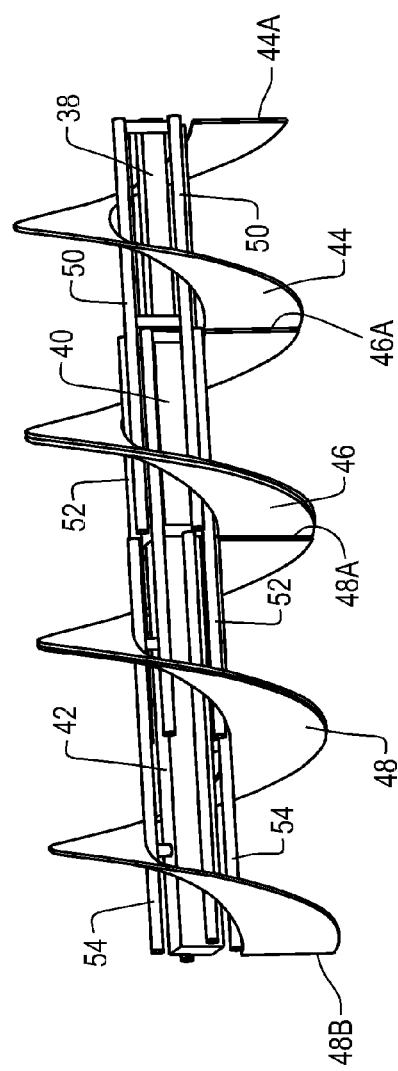
FIG. 9 is a perspective view of the auger arrangement shown in FIGS. 2-8 in a fully retracted state.

Referring now to FIG. 9, the auger 32 is shown fully retracted with a minimum width and the flight sections 44, 46 and 48 stacked together. It should be appreciated that while FIGS. 4-9 illustrate retraction of auger 32 coinciding with reducing the width of the housing assembly 14, expanding auger 32 to coincide with expanding the width of the housing assembly 14 would involve substantially identical movements in the reverse direction. Auger 34 can be configured so that it expands and retracts in a similar fashion to auger 32. When auger 34 is configured to counter rotate relative to auger 32, auger 34 can have flight sections that are oppositely oriented relative to the flight sections 44, 46 and 48 of auger 32 or the auger shafts of auger 34 can rotate in an opposite direction relative to auger shafts 38, 40 and 42 of auger 32. Either configuration would allow for auger 34 to direct material in an opposite direction relative to auger 32 so that both augers 32 and 34 can direct and supply material to a common area, such as impeller 24.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A material moving apparatus, comprising:
   a housing assembly including a central section and at least one wing section, said at least one wing section being positioned on a lateral end of said central section and said at least one wing section being movable toward and away from said central section; and
   an auger arrangement carried by said housing assembly including at least one auger, said at least one auger including a plurality of auger shafts which are slidably movable relative to each other and a plurality of flight sections each having a first end and a second end, each of said flight sections being rotated by a corresponding one of said auger shafts, at least one of said plurality of flight sections being configured to slide its first end past a second end of another one of said plurality of flight sections without rotating as its corresponding auger shaft slidably moves, each of said auger shafts having a non-circular cross-section which prevents significant relative rotation between said auger shafts in an extended position.

2. The material moving apparatus of claim 1, wherein a substantially continuous flight is formed when a first end and a second end of adjacent flight sections are aligned.

3. The material moving apparatus of claim 2, wherein at least two of said plurality of flight sections are identical to one another.

4. The material moving apparatus of claim 1, wherein said housing includes a pair of wing sections that are each positioned on an opposing side of said central section, each of said wing sections being movable toward and away from said central section.

5. The material moving apparatus of claim 4, wherein said auger arrangement includes two augers each having a plurality of auger shafts which are telescopically movable relative to each other and a plurality of flight sections each having a first end and a second end, each of said flight sections being rotated by a corresponding one of said auger shafts, at least one of said plurality of flight sections being configured to slide its first end past a second end of another one of said plurality of flight sections as its corresponding auger shaft telescopically moves.

6. The material moving apparatus of claim 1, wherein at least one of said plurality of auger shafts is coupled to said at least one wing section.

7. The material moving apparatus of claim 6, wherein said at least one wing section has a pillow block bearing attached thereto and said at least one auger shaft has a portion held within said pillow block bearing.

8. The material moving apparatus of claim 1, wherein at least one of said plurality of flight sections is attached to its corresponding auger shaft.

9. The material moving apparatus of claim 8, wherein an auger rod attaches at least one of said plurality of flight sections to its corresponding auger shaft.

10. The material moving apparatus of claim 9, wherein said auger rod is connected to an inner diameter of said flight section attached to its corresponding auger shaft.

11. The material moving apparatus of claim 1, wherein said plurality of auger shafts are telescopically movable relative to each other.

12. The material moving apparatus of claim 1, further comprising a material mover coupled with said housing and supplied with a material by said auger arrangement, said housing having an egress opening and said material mover being configured for moving the supplied material through said egress opening.

13. The material moving apparatus of claim 12, wherein said material mover is an impeller.

14. The material moving apparatus of claim 13, wherein said impeller is configured to have a different rotational speed than said at least one auger.

15. A material moving apparatus, comprising:
a housing assembly including a central section and a pair of wing sections, each of said wing sections being positioned on an opposing side of said central section and being movable toward and away from said central section; and
an auger arrangement carried by said housing assembly including two augers configured to counter rotate relative to one another, at least one of said augers including a plurality of auger shafts which are slidably movable relative to each other and a plurality of flight sections each having a first end and a second end, each of said flight sections being rotated by a corresponding one of said auger shafts, at least one of said plurality of flight sections being configured to slide its first end past a second end of another one of said plurality of flight sections without rotating as its corresponding auger shaft slidably moves, each of said auger shafts having a non-circular cross-section which prevents significant relative rotation between said auger shafts in an extended position.

16. The material moving apparatus of claim 15, wherein at least one of said auger shafts is movable by a wing section.

17. The material moving apparatus of claim 15, wherein a substantially continuous flight is formed when a first end and a second end of adjacent flight sections are aligned.

18. The material moving apparatus of claim 17, wherein at least two of said plurality of flight sections are identical to one another.

19. An auger arrangement, comprising:
a plurality of auger shafts which are slidably movable relative to each other; and
a plurality of flight sections each having a first end and a second end, each of said flight sections being rotated by a corresponding one of said auger shafts, at least one of said plurality of flight sections being configured to slide its first end past a second end of another one of said plurality of flight sections without rotating as its corresponding auger shaft slidably moves, each of said auger shafts having a non-circular cross-section which prevents significant relative rotation between said auger shafts in an extended position.

* * * * *